(12) United States Patent
Goedecke et al.

(10) Patent No.: US 7,720,856 B2
(45) Date of Patent: May 18, 2010

(54) CROSS-LANGUAGE SEARCHING

(75) Inventors: Michael Goedecke, West Chester, PA (US); Ewa Goslawska-Goedecke, West Chester, PA (US)

(73) Assignee: SAP AG, Walldorf (DE)

( * ) Notice: Subject to any disclaimer, the term of this patent is extended or adjusted under 35 U.S.C. 154(b) by 322 days.

(21) Appl. No.: 11/784,800

(22) Filed: Apr. 9, 2007

(65) Prior Publication Data

US 2008/0249992 A1 Oct. 9, 2008

(51) Int. Cl.
*G06F 7/00* (2006.01)
*G06F 17/30* (2006.01)

(52) U.S. Cl. .................... 707/759; 707/760; 704/4; 704/8; 704/9

(58) Field of Classification Search .............. 707/3, 707/4, 5, 6, 999.003, 999.004, 999.005, 999.006; 704/4, 8, 9
See application file for complete search history.

(56) References Cited

U.S. PATENT DOCUMENTS

| | | | | |
|---|---|---|---|---|
| 6,356,894 B2 * | 3/2002 | Nosohara | .................. | 707/3 |
| 6,381,598 B1 * | 4/2002 | Williamowski et al. | ........ | 707/5 |
| 6,466,901 B1 * | 10/2002 | Loofbourrow et al. | ......... | 704/9 |
| 6,604,101 B1 * | 8/2003 | Chan et al. | .................... | 707/4 |
| 6,738,827 B1 * | 5/2004 | Abir | ........................... | 709/245 |
| 6,952,691 B2 * | 10/2005 | Drissi et al. | .................... | 707/3 |
| 7,058,626 B1 * | 6/2006 | Pan et al. | ........................ | 707/4 |
| 7,146,358 B1 * | 12/2006 | Gravano et al. | ................ | 707/4 |
| 2003/0191744 A1 * | 10/2003 | Derr et al. | ....................... | 707/1 |
| 2004/0102201 A1 * | 5/2004 | Levin | ........................ | 455/466 |
| 2006/0112091 A1 * | 5/2006 | Chapman et al. | ............... | 707/4 |
| 2006/0129915 A1 * | 6/2006 | Chan | ......................... | 715/512 |
| 2006/0173829 A1 * | 8/2006 | Neeman | ........................ | 707/3 |
| 2007/0271231 A1 * | 11/2007 | Lin | ................................ | 707/3 |
| 2008/0189257 A1 * | 8/2008 | Wiseman et al. | ............... | 707/4 |
| 2008/0275691 A1 * | 11/2008 | Summerlin et al. | ........... | 704/8 |
| 2009/0193003 A1 * | 7/2009 | Heymans et al. | ............... | 707/3 |
| 2009/0204389 A1 * | 8/2009 | Wang et al. | .................... | 704/7 |

OTHER PUBLICATIONS

'Google™ Language Tools' [online]. Google, Inc., 2007, [retrieved on Sep. 7, 2007]. Retrieved from the Internet: <URL: http://www.google.com/language_tools>.

* cited by examiner

*Primary Examiner*—John E Breene
*Assistant Examiner*—Phong Nguyen
(74) *Attorney, Agent, or Firm*—Mintz, Levin, Cohn, Ferris, Glovsky and Popeo, P.C.

(57) ABSTRACT

Methods and apparatus, including computer program products, related to cross-language searching. Input characterizing search criteria in a first language may be received and a search may be performed on a database having records in a second language. The search may be performed on the database with synonyms of the search criteria that are in the second language. A user may be able to select or edit search criteria in the second language from suggested search criteria. Context information may be used to find search criteria in the second language or results that may be more relevant. The results may be translated for a user to the first language.

15 Claims, 2 Drawing Sheets

CROSS-LANGUAGE SEARCHING

BACKGROUND

The present disclosure relates to data processing by digital computer, and more particularly to cross-language searching.

Search tools may search a body of electronic documents that may be in multiple languages. For example, a search tool may search newspaper web articles written in English and cooking recipes written in Italian. Using some techniques, a search tool may narrow search results to a particular language. For example, a search tool may implement a technique to recognize that several documents are in Portuguese while other documents are in English, and, the search tool may return results that are only in Portuguese or English, depending on a preference of a user. To search in a language other than a user's native language, a user may translate terms using translation tools and use the translated terms as criteria for a search. Then, to understand results the user may use a translation tool to translate the results.

SUMMARY

The subject matter disclosed herein provides methods and apparatus, including computer program products, that implement techniques related to cross-language searching.

In one aspect, data characterizing a query containing first elements is received, a portion of the first elements in a first language is associated with second elements in a second language, a search is performed with the second elements to identify results, and presentation of the results is initiated.

In another aspect, input characterizing search criteria in a first language is received and a search is performed on a database having records in a second language. The search is performed on the database with synonyms of the search criteria that are in the second language.

The subject matter may be implemented as, for example, computer program products (e.g., as source code or compiled code), computer-implemented methods, and systems.

Variations may include one or more of the following features.

The results may be presented to a user or a computer program.

The receiving may include receiving context information related to the query. The context information may be used to filter elements of the second language to be associated with the first elements (e.g., to filter possible search terms in the second language).

Suggested elements in the second language may be presented to a user. The associating may be performed in response to a user selection of the second elements.

The first elements may include search terms and search operators.

Connectors of the query may be translated from the first language to the second language and the connectors might not be part of the first elements.

The results may be translated to the first language (e.g., before presenting the results to the user).

Initiating a presentation of the results may include sending the results to a user interface such that the results are presented to a user or sending the results to another computer program.

The subject matter described herein can be implemented to realize one or more of the following advantages. A user may enter a query in a first language (e.g., a language with which a user is comfortable) and a search tool may automatically search for electronic documents in another language. In some instances this may be helpful as documents may only be available in a language other than a language comfortable to a user, and a user may wish to search those documents. For example, this may be particularly helpful in the information technology field where much documentation has been generated in a language of developers (e.g., English or German) and applications have been localized for other languages, but, supporting documentations for other languages may be limited and a user may able to understand the language of developers but may have difficulty generating a query in that language (e.g., the terms in English may be specialized such that the user might not be familiar with them and finding an equivilant in another language may be difficult). A user may be able to edit or choose from various terms in a second language that correspond to a term in a first language. Context information may be used to filter search terms in the second language and/or filter results. For example, context information (e.g., a name of an application, transaction, application component or application sub-component) may be used to determine which of multiple synonyms in a second language is a best match with a term in a first language. As a user may find technical documents (e.g., help articles) on their own, a user need not contact customer help services such that technical support may have a reduced load. The dictionary to find terms in another language (e.g., synonyms) may be written or managed by the manufacturer of applications for which help articles are written such that a fine-tuning of corresponding terminology across languages may exist (e.g., synonyms for terminology used in an error message may be consistent with terminology in technical help articles).

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
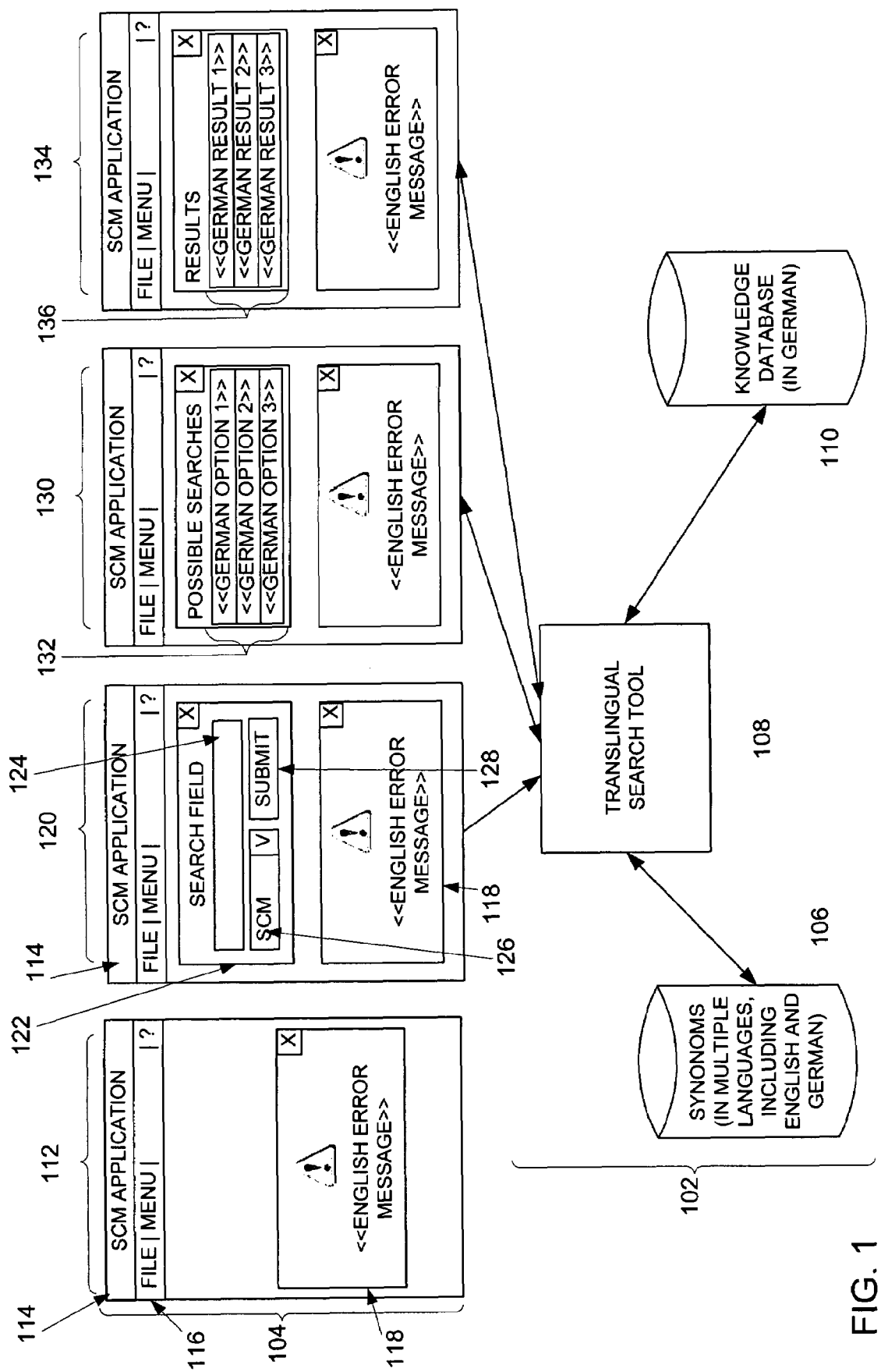
FIG. 1 is a block diagram of a cross-language searching system and a sequence of screens related to the system.

FIG. 1 is a block diagram of a cross-language searching system 102 and a sequence of screens 104 related to the system 102. In general, the system 102 allows a user to search in a first language for documents containing information in a second language, where terms in the first language may be automatically translated to the second language to find documents matching search criteria for those terms. For example, a user may wish to search a database of technical help articles written in German and the user may form a query in English. Terms of the query that are in English may be translated to German and the translated terms may be used to search for help articles matching criteria of the query.

In general, as used in the description, the term language refers to a written language that has a human-spoken counterpart (e.g., English, Spanish, German, and the like), although, other types of languages may be used. Also, different dialects or writing systems of a same language may be differentiated (e.g., they may be considered different languages for purposes of translating from a first language to a second language). For example, a user may form a search using Beijing Mandarin which may be translated to search documents written in Taiwanese Mandarin.

The system 102 includes a database of synonyms 106, a search tool 108, and a knowledge database 110. The database of synonyms 106 may include synonyms of terms in multiple languages. For example, a term for "computer" in English may have synonyms in German, Spanish, Italian, Japanese, and Portuguese. Terms in one language may have a one to one correspondence to terms in another language, a one to many correspondence, or a many to many correspondence. For example, an English term "computer" may be associated with multiple Italian terms, such as "il computer" and "la calcolatore". The synonyms may have different context information associated with them and that context information may correspond to different contexts in which a synonym is used. For example, an English term may have different associated synonyms in German, where a first synonym is associated with usage in a database environment and a second usage is associated with usage in analytics planning environment. For example, the English term "window" may refer to a physical window structure in a building context or a window of a user interface in a software context, and, different context information may be associated with the term window to indicate the term may be used in either context. The context information may be associated with synonyms in the database of synonyms 106 (e.g., a database record of a term may include a list of context information).

The search tool 108 manages searching of documents in the knowledge database 110 with the use of the database of synonyms 106. To interface with a user or application to respond to queries, the search tool 108 may generate the sequence of screens 104, the search tool may interface with a separate system that provides a user interface to an end-user, or the search tool 108 may respond to searches by an application and respond with results to an application such that an end-user need not interact with the search tool 108 (e.g., in a business process, application to application messages may send a query to the search tool 108 and the results of the query may be consumed by the application that sent the query). In some implementations, the search tool 108 may respond to both user-initiated queries and computer-initiated queries.

The search tool interacts with the database of synonyms 106 by sending a request to the database of synonyms 106 for synonyms of one or more terms of a first language in a second language. For example, a query for German synonyms of the English term "online analytical processing" may be sent to the database of synonyms 106. Although that request indicates a desired language, additional, different, or less information may be included in a request. For example, a request may further include a term to filter results based on context information. As another example, a request may simply include the English-language term and synonyms in multiple languages may be returned, and, those synonyms may be filtered by the search tool 108.

The search tool 108 queries the knowledge database 110 to find documents that match criteria of a query. For example, the search tool may send a query to the knowledge database 110 for all documents matching three German terms that were specified in an English query received by the search tool 108. The knowledge database 110 may respond with results, which may be presented to a user by the search tool 108. The results may also be filtered by the search tool 108.

Search criteria included in a query received at the search tool 108 may include terms and operators, or just terms. For example, the search tool 108 may support Boolean operators such as "AND" and "OR". In some implementations, more complex operators may be supported or different types of searching may be supported. For example, different fields may be used to identify different metadata for a search. For example, a field "platform" may identify metadata corresponding to a help article and a user may specify a platform for which help articles are to be searched.

In general, the knowledge database 110 includes articles that correspond to technical help for one or more computer program applications. The knowledge database 110 may respond to requests for documents from the database by the search tool 108. The articles in the knowledge database might only be in the German language. As a user who has a familiarity of the German language may find reading German easier than generating search criteria in German, the search tool 108 may be of great use as it may automatically translate English search criteria into German, which may be used to search the knowledge database 110 and return German results to a user which can read German. In some implementations, the results may be machine-translated to return results in the language used by a user to form search criteria. For example, a machine translator may translate a help article from the knowledge database 110 to English in response to a query in the English language.

Although the system 102 includes a knowledge database 110 that includes technical help articles, additional or different types or information or data may be used. For example, a database of medical articles in English may be searched using terms translated from a Spanish query. Also, other formats and types of information may be searched.

The sequence of screens 104 includes a user interface for an end-user to send and receive results of a query to and from the search tool 108. In the first screen 112, a window 114 of an SCM (e.g., "Supply Chain Management") application is displayed and the window 114 of the application includes a menu bar 116. Above the window 114 (e.g., on a z-axis) is a dialog box 118 with an English-language error message. The SCM application of the window 114 may be localized for an English-language audience, such that the dialog box 118 has the English-language error message. However, help articles for the application might only be available in the German-language (e.g., at the knowledge database 110).

In a second screen 120, a search dialog box 122 is above the window 114. The search dialog box 122 includes a search field 124 to receive input forming a query with search criteria. The dialog box 122 also includes a pull-down menu 126 that may be used to specify context information that identifies metadata of results that are to be part of a query. For example, the pull-down menu 126 may be used to specify the application for which a search is to be narrowed-down such that search results are limited to documents identified as being related to the application (e.g., documents tagged with metadata identifying the document as related to one or more applications). For example, the pull-down menu 126 includes SCM as an option to indicate that only documents related to an SCM application are desired, and the context information may be used as part of the search criteria of a query send to the search tool 108.

As the dialog box 116 has an error message in English and the articles in the knowledge database 110 are in German, and a user might not be familiar with German terms that correspond to the English error message, the user may enter the English-language error message and find related articles with the help of the search tool 108. This may be particularly beneficial for users that are able to read German but have a more difficult time forming queries in German.

After entering search criteria into the search dialog box 122, a query may be submitted to the search tool 108 in response to a user clicking the submit button 128. The search tool 108 may translate English terms to German by finding associated terms in the database of synonyms 106. Then, search criteria in German, which uses the terms from the database of synonyms 106, may be presented to a user and a user may edit the search criteria.

Possible search criteria are presented as three search options 132 in a third screen 130. The three search options 132 allow a user to choose different German search criteria, as multiple German terms may correspond to an English term and a user may be able to distinguish the terms. In some implementations, a user may edit the search criteria. In some implementations, user input might not be used before searching the knowledge database 110. For example, search criteria that are considered the most relevant may be determined and that criteria may be used to search the knowledge database 110 without prompting a user to select or edit search criteria.

In response to a user selecting German search criteria, selected criteria may be used to search the knowledge database 110. Results from the knowledge database may be presented to a user. For example, results of a search may be presented to a user in a user interface as shown in a fourth screen 134. The search results in the third screen 134 include German summaries 136 of three possible German articles that match the criteria of a query and a user may select one of the summaries to see a full article.

Although the search dialog box 122 of the search tool 108 is shown as being part of the SCM application, the search dialog box 122 may be part of a website separate from an application being used. The database of synonyms 106 and the knowledge database 110 may be remote from the search tool 108 and/or a client that has the screens 104. For example, a client hosting the screens 104 may have a client/server relationship with an application server that hosts the search tool 108.

The system 102 may be generated using various technologies. For example, the search tool 108 may be a search tool that accepts synonyms and a dictionary of terms in fifteen languages may be linked to the search tool to perform cross-language searches for synonyms.

Although the knowledge database 110 of FIG. 1 has articles in one language, the articles may be multiple languages and search criteria may be translated to the multiple languages. For example articles may be in English and German and a user may form a search in Portuguese. The search criteria may be translated into both English and German and searches may be performed using both English and German search criteria.

Although FIG. 1 includes a certain discussion of using context information to find appropriate synonyms of a term; many different types of context information may be used. As examples, a name of an application, transaction, application component or application sub-component may be used as context information. As examples, VA01 (which may represent a Sales Order Entry) may be used as context information to identify a type of transaction; FI (which may represent Financials) may be used as context information to identify a type of application component of an Enterprise Resource Planning (ERP) system; FI-CO (which may represent Financial-Controlling) may be used to represent an application sub-component of an ERP system.

Figure 2:
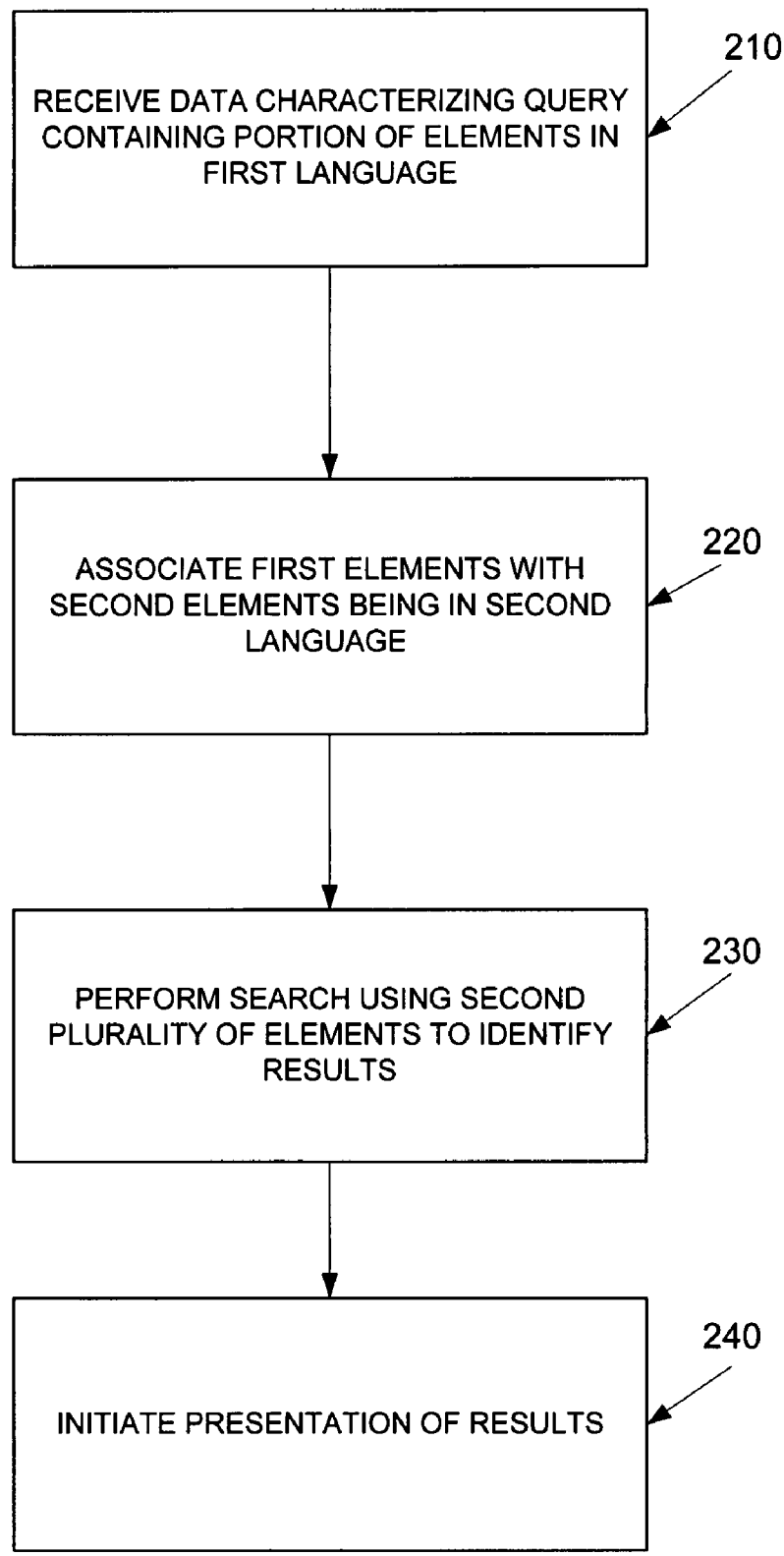
FIG. 2 is a flowchart illustrating a process of performing cross-language searches.

FIG. 2 is a flowchart illustrating a process of performing cross-language searches. The process may be implemented in a system that includes a search tool, a database of synonyms across multiple languages, and a database of electronic documents, where the search terms of a query may be written in one language that is different from a language used in the electronic documents, such as the system 102 of FIG. 1. For example, search terms may be entered in Italian and a database of electronic documents may be in English.

Data characterizing a query containing a portion of elements in first language may be received (210). For example, the data may be received at the search tool 108 of FIG. 1. Search criteria of the query may include terms and connectors, such as Boolean operators. Both the terms and the operators may be in a first language, or in different languages. Some of the terms may be in a second language (e.g., a language to which the terms in the first language are to be translated). For example, a user may translate those terms they know how to translate and leave the in the query terms they are unable to translate.

First elements of the query are associated with second elements being in second language (220). The elements may be terms in the query. For example, search terms of the query may be associated with synonyms. For example, a database of synonyms may be searched.

A search is performed using the second plurality of elements to identify one or more results (230). For example, a search may be performed on a database of technical help articles using terms in a second language that are synonyms of the terms in a first language. The results may match search criteria, which may include excluding terms that are to be excluded or matching metadata to be matched. For example, in some implementations context information may be used to narrow a search. For example, a help function of a program may have knowledge of an application in which the help function exists. An identification of the application may be used to narrow results to a query on a search of help articles.

Presentation of results is initiated (240). For example, a list of results may be sent for display in a user interface. The list of results may include indications of metadata associated with results.

Although the descriptions of FIGS. 1 and 2 refer to searching electronic documents, which include text documents, other types of electronic documents may be searched, including audio, video, pictures, ADOBE FLASH media files, and other forms of media. For example, a video file may have an associated description (e.g., the description may be an attribute of the video file) that may be indexed and the video may be presented to a user a search result.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, tangibly embodied in a computer-readable storage medium, the computer program product being operable to cause data processing apparatus to perform operations comprising:

receiving data characterizing a query containing a first plurality of elements and characterizing context information related to the query, at least a portion of the first plurality of elements being in a first language;

associating the portion of the first plurality of elements with a second plurality of elements, at least a portion of the second plurality of elements being in a second language, wherein a subset of the first plurality of elements in the first language do not have associated elements in the second language;

performing a search using the second plurality of elements in the second language and the subset of the first plurality of elements in the first language to identify one or more results; and initiating a presentation of the results;

wherein the first and second plurality of elements comprise alphanumeric search terms other than search term operators;

wherein the receiving comprises receiving context information related to the query, the context information being used to filter elements of the second language to be associated with the first plurality of elements.

2. The product of claim 1, wherein the operations further comprise presenting to a user suggested elements in the second language, wherein the associating is performed in response to a user selection of the second plurality of elements.

3. The product of claim 1, wherein the first plurality of elements comprises search terms.

4. The product of claim 1, wherein the operations further comprise:

translating connectors of the query, the connectors being in the first language but not being part of the first plurality of elements.

5. The product of claim 1, wherein the operations further comprise:

translating the results to the first language before presenting the results to the user.

6. The product of claim 1, wherein the initiating a presentation of the results comprises sending the results to a user interface such that the results are presented to a user.

7. A method for implementation by one or more data processors comprising:

receiving, by at least one data processor, data characterizing a query containing a first plurality of elements and characterizing context information related to the query, at least a portion of the first plurality of elements being in a first language, the context information identifying a restriction comprising one or more of: a name of a software application, a transaction, a software application component, and a software application sub-component;

associating, by at least one data processor, the portion of the first plurality of elements with a second plurality of elements, at least a portion of the second plurality of elements being in a second language, wherein a subset of the first plurality of elements in the first language do not have associated elements in the second language;

filtering, by at least one data processor, the second plurality of elements in the second language to exclude elements that are not associated with the restriction;

performing, by at least one data processor, a search on the second plurality of elements in the second language and the subset of the first plurality of elements in the first language to identify one or more results; and initiating, by at least one data processor, a presentation of the result;

wherein the first and second plurality of elements comprise alphanumeric search terms other than search term operators.

8. The method of claim 7, wherein the method further comprises presenting, by at least one data processor, to a user suggested elements in the second language, wherein the associating is performed in response to a user selection of the second plurality of elements.

9. The method of claim 7, wherein the method further comprises:

translating, by at least one data processor, the results to the first language before presenting the results to the user.

10. The method of claim 7, wherein the initiating a presentation of the results comprises sending, by at least one data processor, the results to a user interface such that the results are presented to a user.

11. A method for implementation by one or more data processors comprising:

receiving, by at least one data processor, data characterizing a query containing a first plurality of elements and characterizing context information related to the query, at least a portion of the first plurality of elements being in a first language;

associating, by at least one data processor, the portion of the first plurality of elements with a second plurality of elements, at least a portion of the second plurality of elements being in a second language, wherein a subset of the first plurality of elements in the first language do not have associated elements in the second language;

performing, by at least one data processor, a search using the second plurality of elements in the second language and the subset of the first plurality of elements in the first language to identify one or more results; and initiating, by at least one data processor, a presentation of the results;

wherein the first and second plurality of elements comprise alphanumeric search terms other than search term operators;

wherein the receiving comprises receiving context information related to the query, the context information being used to filter elements of the second language to be associated with the first plurality of elements.

12. The method of claim 11, wherein the first plurality of elements comprises search terms.

13. The method of claim 11 further comprising:

translating, by at least one data processor, connectors of the query, the connectors being in the first language but not being part of the first plurality of elements.

14. The method of claim 11, further comprising:

translating, by at least one data processor, the results to the first language before presenting the results to the user.

15. The method of claim 11, wherein the initiating a presentation of the results comprises sending, by at least one data processor, the results to a user interface such that the results are presented to a user.

* * * * *